United States Patent [19]

Faul et al.

[11] Patent Number: 5,070,532
[45] Date of Patent: Dec. 3, 1991

[54] METHOD FOR ENCODING COLOR IMAGES

[75] Inventors: Jerome F. Faul, Sunnyvale; Julien T. Nguyen, Redwood City, both of Calif.

[73] Assignee: Radius Inc., San Jose, Calif.

[21] Appl. No.: 588,560

[22] Filed: Sep. 26, 1990

[51] Int. Cl.$^5$ .............................................. G06K 9/00
[52] U.S. Cl. ........................................ 382/56; 358/433
[58] Field of Search .............. 382/56; 358/261.3, 427, 358/432, 433, 75, 78; 364/715.02, 526

[56] References Cited

U.S. PATENT DOCUMENTS

| | | | |
|---|---|---|---|
| 3,694,813 | 9/1972 | Loh et al. | 340/172.5 |
| 4,101,959 | 7/1978 | Domike et al. | 364/200 |
| 4,194,221 | 3/1980 | Stoffel | 358/283 |
| 4,300,122 | 11/1981 | McMahon | 340/146.3 |
| 4,319,267 | 3/1982 | Mitsuya et al. | 358/133 |
| 4,467,421 | 8/1984 | White | 364/200 |
| 4,580,134 | 4/1986 | Campbell et al. | 358/133 |
| 4,622,545 | 11/1986 | Atkinson | 340/747 |
| 4,631,521 | 12/1986 | El-Sherbini | 340/347 |
| 4,646,356 | 2/1987 | Anderson et al. | 382/56 |
| 4,673,977 | 6/1987 | Steizenmuller | 358/133 |
| 4,686,578 | 8/1987 | Asano | 358/280 |
| 4,707,729 | 11/1987 | Bruno et al. | 358/13 |
| 4,729,127 | 3/1988 | Chan et al. | 382/56 |
| 4,743,959 | 5/1988 | Frederiksen | 358/133 |
| 4,743,973 | 5/1988 | Endo et al. | 358/260 |
| 4,764,975 | 8/1988 | Inoue | 382/47 |
| 4,788,598 | 11/1988 | Ochi et al. | 358/260 |
| 4,797,940 | 1/1989 | Suzuki et al. | 382/56 |
| 4,831,659 | 5/1989 | Miyaoka et al. | 382/56 |
| 4,866,514 | 9/1989 | Yeomans | 358/80 |
| 4,914,508 | 4/1990 | Smith et al. | 358/13 |
| 4,922,349 | 5/1990 | Abe et al. | 358/443 |
| 4,965,754 | 10/1990 | Stansfield et al. | 364/526 |
| 4,965,845 | 10/1990 | Chan et al. | 382/56 |
| 4,972,497 | 11/1990 | Saito et al. | 382/56 |
| 4,980,764 | 12/1990 | Henot | 358/133 |

FOREIGN PATENT DOCUMENTS

| | | | |
|---|---|---|---|
| 2538724 | 3/1977 | Fed. Rep. of Germany | 358/427 |
| 0079569 | 6/1980 | Japan | 358/426 |
| 0030366 | 3/1981 | Japan | 358/426 |
| 0200670 | 11/1983 | Japan | 358/426 |
| 1556368 | 11/1979 | United Kingdom | 358/427 |

OTHER PUBLICATIONS

Huang et al., Facsimile Coding by Skipping White, IEEE Trans. on Comm., vol. 23, No. 12 at 1452, (Dec. 1975).

Primary Examiner—Leo H. Boudreau
Attorney, Agent, or Firm—Stuart P. Meyer

[57] ABSTRACT

Color image information is encoded by grouping together adjacent pixels into blocks, determining which one of several templates each block most closely approximates, and encoding each block in accordance with the rules for a particular template. Data compression without loss of image quality results because the encoding rules for each template ignore irrelevant or duplicative information, thereby saving space for information that is important.

5 Claims, 4 Drawing Sheets

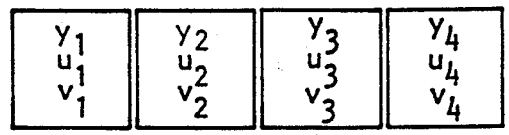

BLOCK OF 4 x 1 PIXELS

4 BITS OF CASE #

28 BITS OF CODE

| 0 | 6 | 7 | 13 | 14 | 20 | 21 | 27 |

| # | | | | | | |
|---|---|---|---|---|---|---|
| 1 | y1 | y2 | y3 | y4 | | |
| 2 | y1 = y2 | y3 = y4 | u1 = u2 = u3 = u4 | v1 = v2 = v3 = v4 | | |
| 3 | y1 | y2 = y3 = y4 | u1 = u2 = u3 = u4 | v1 = v2 = v3 = v4 | | |
| 4 | y1 = y2 = y3 | y4 | u1 = u2 = u3 = u4 | v1 = v2 = v3 = v4 | | |
| 5 | y1 = y4 | y2 = y3 | u1 = u2 = u3 = u4 | v1 = v2 = v3 = v4 | | |
| 6 | y1 | y2 | y3 | y4 | u1 = u2 = u3 = u4 | v1 = v2 = v3 = v4 |
| 7 | y1 | u2 | v2 | y2 = y3 = y4 | u2 = u3 = u4 | v2 = v3 = v4 |
| 8 | y2 | u2 | v2 | y3 = y4 = y1 | u3 = u4 = u1 | v3 = v4 = v1 |
| 9 | y3 | u3 | v3 | y4 = y1 = y2 | u4 = u1 = u2 | v4 = v1 = v2 |
| 10 | y4 | u4 | v4 | y1 = y2 = y3 | u1 = u2 = u3 | v1 = v2 = v3 |
| 11 | y1 = y2 | u1 = u2 | v1 = v2 | y3 = y4 | u3 = u4 | v3 = v4 |
| 12 | y2 = y3 | u2 = u3 | v2 = v3 | y4 = y1 | u4 = u1 | v4 = v1 |
| 13 | y1 = y3 | u1 = u3 | v3 = v4 | y2 = y4 | u2 = u4 | v2 = v4 |
| 14 | y1 | u1 | v1 | y2 = y3 | u2 = u3 | v2 = v3 | y4 | u4 | v4 |
| 15 | y1 | y2 | u1 = u2 | v1 = v2 | y3 | y4 | u3 = u4 | v3 = v4 |
| 16 | y1 | u1 | v1 | y2 | u2 | v2 | y3 | u3 | v3 | y4 | u4 | v4 |

Figure 4

METHOD FOR ENCODING COLOR IMAGES

BACKGROUND AND FIELD OF THE INVENTION

This invention relates generally to the storage, processing and transmission of image information and specifically to a method for efficiently encoding color image information to be displayed or printed.

Color images are conventionally encoded and processed in display or printing systems by parsing the images into component signals and operating on those component signals. In raster-type display systems, it is common to parse color image information into a number of pixels and to provide separate R, G and B signals corresponding to the red, green and blue components of each pixel, respectively. Another common method is to parse the image information into pixels and to provide separate y, u and v signals defining the luminance, hue and saturation of the image.

Digital representation of color images is typically accomplished by representing each pixel of an image by an encoded binary number. It is commonly thought that 256 levels each of red, green and blue information are required to adequately represent the entire visual range to the human eye. Therefore, it is common to assign eight bits to each of the R, G and B signals to form a 24-bit digital word conveying the information for each pixel.

However, it is comparatively more difficult to process 24-bit pixel information than it is to process pixel information that uses fewer bits. Where computing capability is somewhat limited, fewer bits will sometimes be used at the expense of image quality.

Use of a lower pixel depth (number of bits per pixel) affects different types of images or image portions differently. For some image portions, there may be little noticeable difference between a 24-bit pixel depth and an eight-bit pixel depth. For others image portions, the difference in image quality may be significant.

SUMMARY OF THE INVENTION

In accordance with the present invention, an encoding algorithm is employed to determine which one of several types of image templates a set of adjacent pixels most closely approximates. Depending upon the result of this selection, each pixel in the set is encoded with information in a manner that is most efficient in yielding a satisfactory result when the information is decoded and displayed or printed. By this allocation of different blocks of pixels to different encoding schemes, an eight or nine bit pixel depth may be used to achieve images of almost identical quality to images conventionally displayed using 24 bit pixel depth.

BRIEF DESCRIPTION OF THE DRAWINGS

FIG. 4 illustrates bit configurations for each of the 16 pixel block allocations of an eight bit pixel depth implementation of the scheme of the present invention.

DETAILED DESCRIPTION OF THE DRAWINGS

Figure 1:
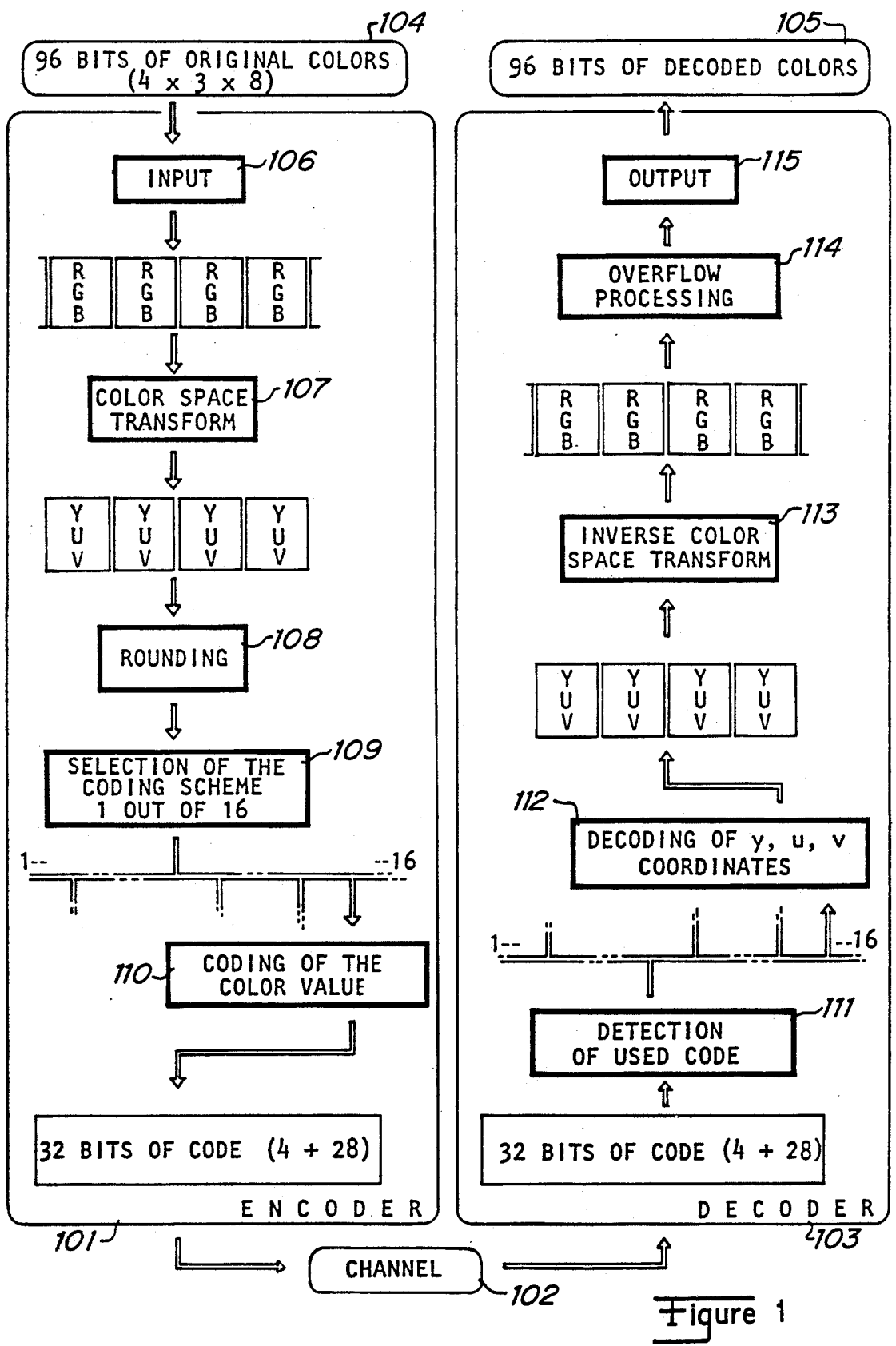
FIG. 1 is a functional block diagram of encoding and decoding operations in accordance with the present invention.

Referring now to FIG. 1, there is shown a block diagram of encoding and decoding operations in accordance with the present invention. In general terms, the implementation of FIG. 1 operates by applying input color information 104 to an encoder 101, transmitting (and, if desired, processing) the encoded information over a channel 102, and operating on that information by a decoder 103 to yield output color information 105 for display or printing.

More specifically, the processing of the encoder 101 comprises an input stage 106, a transform stage 107, a rounding stage 108, a pixel configuration detection stage 109, and a color coordinate coding stage 110.

In the preferred embodiment, a conventional 24 bit Pixel depth RGB digital video signal from a bit-mapped image is applied to the input stage 106. The input stage 106 reads this information in groupings of adjacent pixels. In the preferred embodiment, the input stage 106 reads four adjacent pixels at a time.

The transform stage 107 converts the RGB pixel information into a new color space. Such transformation decorrelates the color components of the input signal 104 and increases the efficiency of the pixel configuration detection and allocation that is to follow. In the preferred embodiment, the transform used is:

$$y = r/4 + g/2 + b/4$$
$$u = r/2 - g/4 - b/4 \quad \text{(Eq. 1)}$$
$$V = g/2 - b/2$$

with the corresponding reverse transform:

$$r = y + 3u/2 - b/4$$
$$g = y - u/2 + 3v/4 \quad \text{(Eq. 2)}$$
$$b = y - u/2 - 5v/4$$

where r, g and b are the red, green and blue components from the applied input signal; r, g, b and y vary from 0 to 255; u and v vary from $-128$ to 127.

These particular transform equations were chosen because they are quite simple and yield signals y, u and v that relate to the luminance, hue and saturation signals conventionally used in presenting color images on raster-type displays. More specifically, y approximates but is not directly proportional to the conventional signal for luminance, and in the (u, v) plane, the polar coordinates of vector $x = (2u, \sqrt{3}v)$ are the conventional hue and saturation signals.

Once y, u and v are calculated from r, g and b in transform stage 107, these values are rounded in stage 108. The rounding formula is:

$$y' = [y + \tfrac{1}{2}]$$
$$u' = [u + \tfrac{1}{2}] \text{ if } u \geq 0$$
$$u' = [u - \tfrac{1}{2}] \text{ else} \quad \text{(Eq. 3)}$$
$$v' = [v + \tfrac{1}{2}] \text{ if } v \geq 0$$
$$v' = [v - \tfrac{1}{2}] \text{ else}$$

where $[x] = n$ if $x \geq 0$, $[x] = n+1$ if $x < 0$, and $n \leq x \leq n+1$, where n is an integer.

This rounding minimizes the mean square error on y, u and v. The value of ½ is added or subtracted in the above equations to provide rounding rather than simple truncation. Even so, the mean error on y resulting from such rounding is equal to ⅛. In order to compensate for this error, a corresponding rounding function is performed in the decoder 103, specifically:

$$r = [r' + \tfrac{1}{8}]$$

$$g = [g' + \tfrac{1}{8}]$$

$$b = [b' + \tfrac{1}{8}]$$

After forward and reverse transforms the mean error is equal to 0, on a first approximation. The advantage of this 0 value is that the encoding and decoding operations can be iterated without a shift in the colors displayed. A very small change in the value of the mean error (as small as ⅛) will create bright or dark dots on the display after several iterations.

Figure 2:
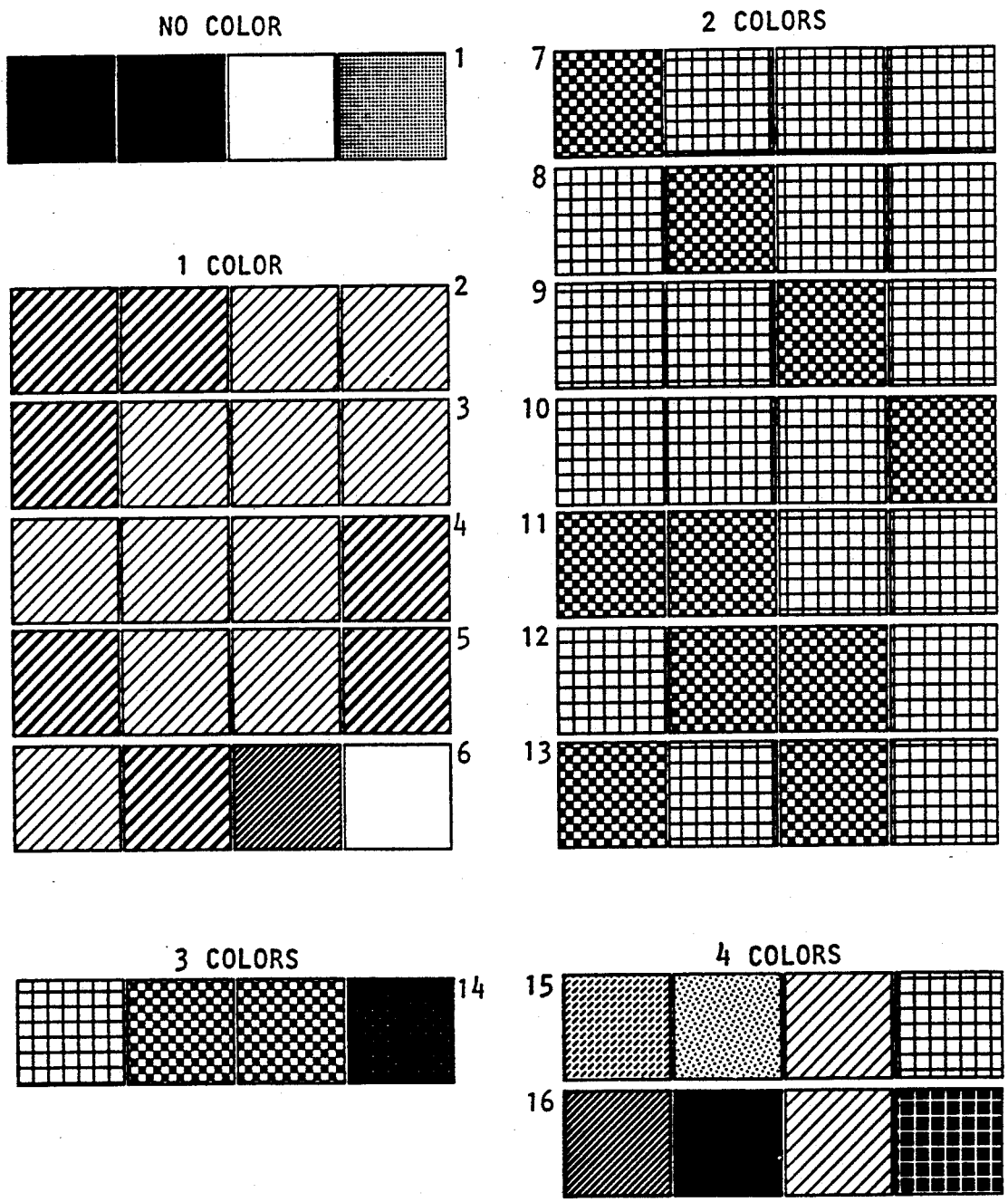
FIG. 2 is a diagram illustrating examples of how pixel blocks may be allocated in accordance with the present invention.

The next stage 108 detects which of several predefined types of pixel configurations the current block of pixels most closely approximates. In one embodiment of the invention, 16 different codes are used according to the configuration of four adjacent pixels. Referring now also to FIG. 2, the 16 different possible configurations are the following (y is for luminance and c is for color, i.e., u and v):

* no color in the block: 1st case, all the pixels are gray.
* only 1 single color in the block:
  2nd case, variation of y between the 2nd & 3rd pixels.
  3rd case, variation of y between the 1st & 2nd pixels.
  4th case, variation of y between the 3rd & 4th pixels.
  5th case, variation of y between the 1st & 2nd pixels and 3rd & 4th pixels.
  6th case, variation of y between each
* only 2 different colors in the block:
  7th case, variation of c between 1st & 2nd pixels.
  8th case, 2nd pixel has a different c from others.
  9th case, 3rd pixel has a different c from others.
  10th case, variation of c between 3rd & 4th pixels.
  11th case, variation of c between 2nd & 3rd pixels.
  12th case, same c for 2nd & 3rd pixels and same c for 1st & 4th pixels.
  13th case, same c for 1st & 3rd pixels and same c for 2nd & 4th pixels.
* 3 different colors in the block:
  14th case, same c for 2nd & 3rd pixels.
* all 4 pixels have a different color:
  15th case, different c for each pixel.
  16th case, very different c for each pixel.

If the configuration of a pixel block is not exactly one of these 16 configurations a default case for the particular configuration of the input pixel block is selected. If there is no variation of y or c the default case is the 2nd one, if there is a variation of y but not of c it is the 6th, if there is a variation of c it is the 15th.

In the preferred embodiment, a threshold value is used to determine whether there is a variation in y or c between two pixels and whether that variation is small or large. A threshold level of 16 is used to define "small" variations, and a threshold level of 64 is used to define "large" variations.

Figure 3:
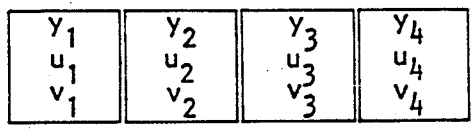
FIG. 3 illustrates bit configurations for each of the 16 pixel block allocations of a nine bit pixel depth implementation of the scheme of the present invention.

Once the allocation of pixel blocks to one of the standard configurations is made in stage 109, the actual coding of information is performed in accordance with the selected configuration in stage 110. The type and depth of information to be encoded is preselected for each configuration to maximize the retention of information that is important for each different configuration. For instance, in a case where all of the pixels are gray, there is no useful hue or saturation information. Thus, there is nothing to be gained by retaining hue or saturation information, and bits in this configuration can be completely allocated to transmitting luminance information at full depth. This will result in an extremely sharp displayed or printed gray-scaled image. In an embodiment using nine-bit pixel depth and grouping adjacent pixels together into blocks of four, the allocation of bits may be performed as illustrated in FIG. 3. Four bits of a 36-bit word are allocated to storing the case number for the configuration of a pixel block, and the remaining 32 bits are allocated as illustrated, specifically:

* 1st case, 8 bits for each y value.
* 2nd through 5th case, $2 \times 8$ bits for common u and v values and $2 \times 8$ bits for different y values.
  6th case, $2 \times 8$ bits for common u and v values, $4 \times 4$ bits for different y values.
  7th through 10th case, $2 \times 6$ bits for common u and v values, 8 bits for common y value, $3 \times 4$ bits for different y, u and v values.
  11th through 13th case, $2 \times 2 \times 6$ bits for common u and v values, $2 \times 4$ bits for common y values.
  14th case, $3 \times 4$ bits for common y, u and v values, $2 \times 3$ bits for different y values, $2 \times 4$ bits for different u values, $2 \times 3$ bits for different v values.
  15th case $2 \times 2 \times 4$ bits for common u and v values, $4 \times 4$ bits for different y values.
  16th case, $4 \times 2 \times 3$ bits for different u and v values, $4 \times 2$ bits for different y values.

Referring now to FIG. 4, in an implementation using an eight bit pixel depth and blocks of four pixels, 32 bit words are used for each block, 4 bits are used to identify the configuration, and the remaining 28 bits are allocated as follows:

* 1st case, 7 bits for each y value.
* 2nd through 5th case, $2 \times 7$ bits for common u and v values and $2 \times 7$ bits for different y values.
  6th case, $2 \times 7$ bits for common u and v values, $4 \times 4$ bits for different y values.
* 7th through 10th case, $2 \times 5$ bits for common u and v values, 6 bits for common y value, $3 \times 4$ bits for different y, u and v values.
  11th through 13th case, $2 \times 2 \times 5$ bits for common u and v values, $2 \times 4$ bits for common y values.
* 14th case, $2 \times 3$ bits for common u and v values, 4 bits for common y value, $2 \times 3$ bits for different y values, $2 \times 2 \times 3$ bits for each different u and v values.
* 15th case, $2 \times 2 \times 4$ bits for common u and v values, $4 \times 3$ bits for different y values.
  16th case, $4 \times 3$ bits for different u values, $4 \times 3$ bits for different va values, $4 \times 2$ bits for different y values.

As indicated in the description above, the embodiments of the present invention often must map eight-bit y, u and v data words into words of smaller bit length. One simple scheme for doing this would be to simply use the most significant bits of the original word and discard the remaining (least significant) bits. However, this simple binary truncation yields significant errors for large-value words. For instance, the eight-bit binary value 1111 1111 (decimal 255) when mapped to a four bit word would be simply 1111. When mapped back to an eight-bit word, this value would be 1111 0000 (decimal 240).

To reduce such errors caused by truncation, it is desirable to have the smallest four-bit number 0000 (decimal 0) correspond to the smallest eight-bit number 0000 0000 (decimal 0) and to have the largest four-bit number 1111 (decimal 15) correspond to the largest eight-bit number 1111 1111 (decimal 255). For the values between theses two extremes to be equidistant, each four-bit number should correspond exactly with an eight-bit number that is a multiple of decimal 17, such as 0000 0000, 0001 0001, 0010 0010, etc. These numbers happen to be extremely easy to encode with four bits, since the most significant four bits and the least significant four bits are identical in each case. Therefore the transformation from an eight-bit value to a four-bit value is accomplished by rounding the eight-bit value to the nearest multiple of 17 and using the four-bit value corresponding to that multiple of 17. The rounding function is performed similarly to the rounding functions described above in connection with Equation Set 3: The original number is truncated after a value equal to one-half the truncation step has been added to it. The actual mapping is performed through the use of a look-up table or other conventional means, although in the case of eight-bit to four-bit transformation, the mapping may be accomplished simply by using the most significant four bits of the rounded eight-bit word. Transformations from starting word lengths other than eight bits and to ending word lengths other than four bits may be accomplished in a similar manner.

In any sequence of transformation and re-transformation, it is possible to obtain "overflow" values outside the permissible range for a given word length. In such cases, to avoid overflow error the value used is the maximum or minimum, as applicable, for the given word size.

The implementations described herein achieve efficient use of memory by storing only once values of signals that are common between two or more pixels. However, since values will be considered common whenever they do not exceed a certain threshold value, a method for determining what to use as the "common" value is required. In the preferred embodiment, the average of the values for each of the pertinent pixels is used. This strategy helps to avoid error propagation that would result from simply using one of the values from a pertinent pixel.

Referring again to FIG. 1, channel 102 may be any bus, processor or other transmission or processing channel. Operation of decoder 103 generally complements that of encoder 102. First, an incoming data word is processed to detect which configuration case applies to that block of pixels in detection stage 111. Based upon the information from stage 111, stage 112 decodes the information into the constituent y, u and v components. Stage 113 performs the reverse transform described above in connection with Equation Set 2 to recreate the r, g and b components from the y, u and v components, and stage 114 performs the processing of overflow values described previously. Finally, output stage 115 applies output signal 105 in synchronization with the display screen or printing device.

As an additional disclosure, the source code for the portion of a computer software package, for operation on conventional "MACINTOSH" computer systems supplied by Apple Computer, Inc., that includes the preferred embodiment of the invention is provided below as an appendix. It should be noted that terminology in the source code may differ slightly from that in the remainder of the specification. Any differences in terminology, however, will be easily understood by those skilled in the art.

Therefore, a method is provided for encoding color image information for efficient transmission or processing.

What is claimed is:

1. A method of encoding image information to be displayed by a conventional computer system, comprising the steps of:
   grouping together adjacent portions of said information into a plurality of blocks, all such blocks being of an identical fixed size;
   for each of said blocks, selecting one of a plurality of encoding schemes responsive to the portions of information comprising said block; and
   encoding said block by writing a single encodes data word of fixed size that comprises a code identifying said selected encoding scheme and a plurality of data segments, each segment having a particular number of data bits responsive to said image information in said block, arranged in accordance with said selected encoding scheme.

2. A method as in claim 1, wherein the image information is bit-mapped RGB color video information and all color information for each said data block is encoded in said single encoded data word.

3. A method as in claim 2 further comprising the step of transforming the color space of said color image information before encoding in said single encoded data word.

4. A method as in claim 3 wherein said step of transforming decorrelates color components from said image information.

5. A method of mapping binary data for display by a conventional computer system from a first format having a first word length to a second format having a second word length, comprising the steps of:
   selecting a first minimum possible value for words in said second format;
   selecting a first maximum possible value for words in said second format;
   determining the number of possible intermediate values for words in said second format between said first minimum and first maximum values;
   selecting a second minimum possible value for words in said first format;
   selecting a second maximum possible value for words in said firs format;
   selecting intermediate values for words in said first format responsive to said number of possible intermediate values for words in said second format and equidistant to adjacent selected values;
   determining a correspondence between said selected values in said second format and said selected values in said first format;
   rounding said binary data to one of said selected values in said first format; and
   mapping said binary data to one of said selected values in said second format responsive to said rounding and said correspondence.

* * * * *

UNITED STATES PATENT AND TRADEMARK OFFICE
CERTIFICATE OF CORRECTION

PATENT NO. : 5,070,532

DATED : December 3, 1991

INVENTOR(S) : Jerome F. Faul and Julien T. Nguyen

It is certified that error appears in the above-identified patent and that said Letters Patent is hereby corrected as shown below:

On the Title page,
[56] References Cited, line 19, "4,797,940" should be --4,797,945--.
Col. 2, line 37, "V" should be --v--.
Col. 2, line 40, "b/4" should be --v/4--.
Col. 3, line 1, "x$\leq$ n" should be --x$<$ n--.
Col. 3, line 8, "5/8" should be --1/8--.
Col. 3, line 41, "between each" should be --between each pixel--.
Col. 4, line 59, "values, 4 x 3" should be --values, 4 x 2--.
Col. 4, line 60, "va" should be --v--.
Col. 6, line 22, "encodes" should be --encoded--.
Col. 6, line 54, "firs" should be --first--.

Signed and Sealed this

Twenty-fifth Day of May, 1993

Attest:

MICHAEL K. KIRK

*Attesting Officer*   *Acting Commissioner of Patents and Trademarks*